(12) United States Patent
Zhou et al.

(10) Patent No.: US 12,204,777 B2
(45) Date of Patent: Jan. 21, 2025

(54) SPACE MANAGER FOR TRANSPARENT BLOCK DEVICE COMPRESSION

(71) Applicant: Lemon Inc., Grand Cayman (KY)

(72) Inventors: Ping Zhou, Los Angleles, CA (US); Kan Frankie Fan, Los Angeles, CA (US); Chaohong Hu, Los Angeles, CA (US); Longxiao Li, Los Angeles, CA (US); Hui Zhang, Los Angeles, CA (US); Fei Liu, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 18/187,088

(22) Filed: Mar. 21, 2023

(65) Prior Publication Data
US 2023/0229324 A1 Jul. 20, 2023

(51) Int. Cl.
*G06F 3/06* (2006.01)
(52) U.S. Cl.
CPC .......... *G06F 3/0631* (2013.01); *G06F 3/0608* (2013.01); *G06F 3/064* (2013.01); *G06F 3/0673* (2013.01)
(58) Field of Classification Search
CPC ...... G06F 3/0631; G06F 3/0608; G06F 3/064; G06F 3/0673; G06F 3/0659; G06F 3/0683
See application file for complete search history.

(56) References Cited

U.S. PATENT DOCUMENTS

| | | | |
|---|---|---|---|
| 2008/0307188 A1* | 12/2008 | Franaszek | G06F 9/5016 711/E12.016 |
| 2011/0196987 A1* | 8/2011 | Benhase | G06F 3/0608 707/747 |
| 2015/0242309 A1* | 8/2015 | Talagala | G06F 3/064 711/103 |
| 2017/0220284 A1 | 8/2017 | Jain et al. | |
| 2017/0364446 A1* | 12/2017 | Pham | G06F 12/1027 |
| 2019/0056882 A1 | 2/2019 | Feldman et al. | |
| 2019/0243582 A1 | 8/2019 | Satoyama et al. | |
| 2020/0134045 A1 | 4/2020 | Armangau et al. | |
| 2022/0405200 A1* | 12/2022 | Karr | G06F 3/067 |

OTHER PUBLICATIONS

European Search Report for EP Patent Application No. 24164405.3, Issued on Jul. 10, 2024, 10 pages.

* cited by examiner

*Primary Examiner* — Francisco A Grullon
(74) *Attorney, Agent, or Firm* — Faegre Drinker Biddle & Reath LLP

(57) ABSTRACT

Systems and methods for space allocation for block device compression are provided. In particular, a computing device may receive an allocation request to write the compressed data, select a range list adequate for serving the allocation request from a plurality of range list, dequeue a range entry from the selected range list to allocate free space for the compressed data, and allocate the free space corresponding to the range entry to the compressed data to serve the allocation request.

20 Claims, 8 Drawing Sheets

SPACE MANAGER FOR TRANSPARENT BLOCK DEVICE COMPRESSION

BACKGROUND

Instance storage is a widely known Infrastructure-as-a-Service (IAAS) product offered by Cloud Service Providers (CSPs). High performance storage devices (e.g., Non-Volatile Memory Express solid-state drives (NVMe SSDs)) on a server are virtualized and partitioned into multiple virtual block devices, which are provided to user's virtual machine (VM) instances as their local storage. Since most of the commodity NVMe SSDs do not offer NVMe virtualization (e.g., single root I/O virtualization (SR-IOV)) or multiple namespaces (e.g., partitioning) and supporting these features with software is costly, a common approach used by CSPs is to use a dedicated hardware (e.g., a storage management system) between the host (i.e., server) and the NVMe SSDs. The storage management system may offload jobs of storage virtualization, managing of multiple namespaces, input/output (I/O) routing, address mapping, and the like.

Additionally, compression and decompression are typically performed at block level. Since compressed block may become variable in size, the compressed block is generally padded to a fixed granularity. A mapping table (e.g., Compression Mapping Table (CMT)) is needed to track the mapping between every original uncompressed block address and its compressed block address on physical storage devices (i.e., NVMe SSDs). However, it is often challenging to track, manage, and allocate free space for compressed blocks on the physical storage devices.

It is with respect to these and other general considerations that the aspects disclosed herein have been described. Also, although relatively specific problems may be discussed, it should be understood that the examples should not be limited to solving the specific problems identified in the background or elsewhere in this disclosure.

SUMMARY

The present disclosure relates to instance storage. More particularly, the present disclosure teaches a storage management system for tracking and managing free space for compressed blocks on physical storage devices.

In accordance with at least one example of the present disclosure, a method for space allocation for block device compression is provided. The method includes receiving an allocation request to write the compressed data, the allocation request including a size of the compressed data, selecting a range list adequate for serving the allocation request from a plurality of range lists, each range list configured to track free spaces of a certain size and has a plurality of range entries, dequeuing a range entry from the selected range list to allocate free space for the compressed data, and allocating the free space corresponding to the range entry to the compressed data to serve the allocation request.

In accordance with at least one example of the present disclosure, a computing device for space allocation for block device compression is provided. The computing device may include a processor and a memory having a plurality of instructions stored thereon that, when executed by the processor, causes the computing device to: receive an allocation request to write the compressed data, the allocation request including a size of the compressed data, select a range list adequate for serving the allocation request from a plurality of range lists, each range list configured to track free spaces of a certain size and has a plurality of range entries, dequeue a range entry from the selected range list to allocate free space for the compressed data, and allocate the free space corresponding to the range entry to the compressed data to serve the allocation request.

In accordance with at least one example of the present disclosure, a non-transitory computer-readable medium storing instructions for space allocation for block device compression is provided. The instructions when executed by one or more processors of a computing device, cause the computing device to: receive an allocation request to write the compressed data, the allocation request including a size of the compressed data, select a range list adequate for serving the allocation request from a plurality of range lists, each range list configured to track free spaces of a certain size and has a plurality of range entries, dequeue a range entry from the selected range list to allocate free space for the compressed data, and allocate the free space corresponding to the range entry to the compressed data to serve the allocation request.

Any of the one or more above aspects in combination with any other of the one or more aspects. Any of the one or more aspects as described herein.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Non-limiting and non-exhaustive examples are described with reference to the following Figures.

DETAILED DESCRIPTION

Figure 1:
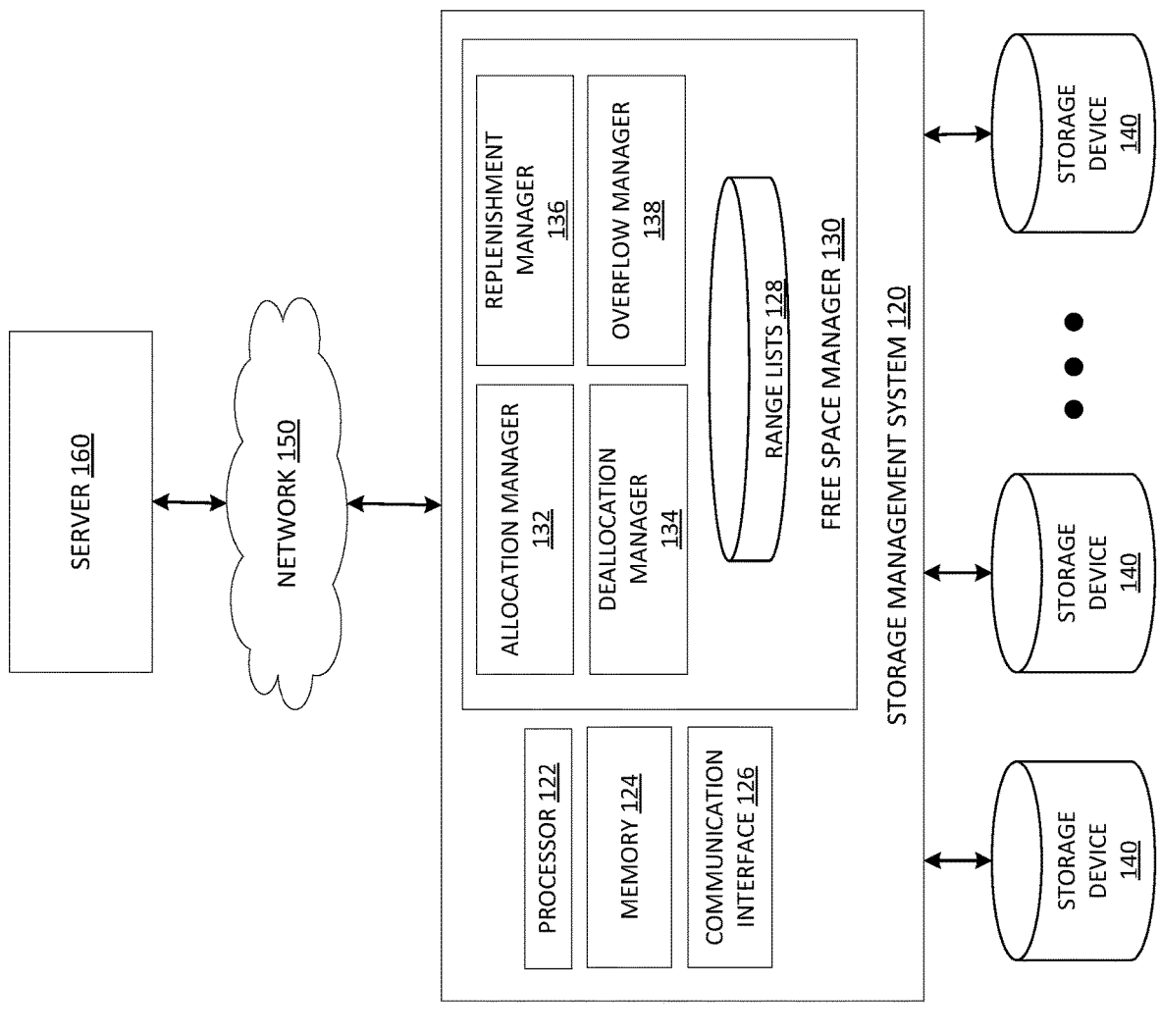
FIG. 1 depicts a block diagram of an example of an operating environment in which a block storage system for managing free space for transparent block-level compression may be implemented in accordance with examples of the present disclosure.

In the following detailed description, references are made to the accompanying drawings that form a part hereof, and in which are shown by way of illustrations specific aspects or examples. These aspects may be combined, other aspects may be utilized, and structural changes may be made without departing from the present disclosure. Aspects may be practiced as methods, systems or devices. Accordingly, aspects may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Instance Storage is a widely known Infrastructure-as-a-Service (IAAS) product offered by Cloud Service Providers (CSPs). High performance storage devices on a server, typically Non-Volatile Memory Express solid-state drives (NVMe SSDs), are virtualized and partitioned into multiple virtual block devices, which are provided to user's virtual machine (VM) instances as their local storage. Since most of the commodity NVMe SSDs do not offer NVMe virtualization (e.g., single root I/O virtualization (SR-IOV)) or multiple namespaces (e.g., partitioning) and supporting these features with software is costly, a common approach used by CSPs is to use a dedicated hardware (e.g., a storage management system) between the host (i.e., server) and the NVMe SSDs. The storage management system may offload jobs of storage virtualization, managing of multiple namespaces, input/output (I/O) routing, address mapping, and the like.

Additionally, compression and decompression are typically performed at block level. Since compressed block may become variable in size, the compressed block is generally padded to a fixed granularity. A mapping table (e.g., Compression Mapping Table (CMT)) is needed to track the mapping between every original uncompressed block address and its compressed block address on physical storage devices (i.e., NVMe SSDs). However, it is often challenging to track, manage, and allocate free space for compressed blocks on the physical storage devices.

In accordance with examples of the present disclosure, free space is allocated and deallocated using range lists for certain ranges of free spaces. To do so, during the initialization sequence (e.g., during boot up), a Compression Mapping Table (CMT) is scanned to reconstruct free space information. Specifically, a bitmap of free space is constructed from the CMT and written to a reserved area on a physical storage device. It should be appreciated that the bitmap may not be needed at runtime. Additionally, each range list is filled with range entries to its maximum capacity or a predetermined threshold during initialization. The maximum capacity may be calculated from the expected write throughput of the system. This avoids the excessive memory overhead introduced by the range lists.

At runtime, free space is allocated from a corresponding range list by dequeuing a range entry. Additionally, space assigned to a compressed block may be deallocated and reallocated back to a corresponding range list by enqueuing a range entry. Each range list tracks free spaces of a certain size. For example, the range lists are sized to align with the expected write throughput. Rest of the free space information is tracked in the bitmap which is stored on the backend storage devices and is used to replenish the range lists as needed and to reallocate overflow of the range lists. If the available range entries in the range lists fall below a predetermined minimum threshold (e.g., 25%), more entries are added from the bitmap. In other words, the range lists serve like a quick cache for serving allocation needs, while the bitmap on the storage device provides the overall picture of available free space, replenishes the range lists when needed, and reallocates overflow of the range lists.

It should be appreciated that the bitmap is used to track usages of blocks on the storage devices and is stored in a reserved area on the storage devices or a dedicated storage device. For example, each physical block on the storage device is tracked by one bit. In the illustrative aspect, the bitmap is a global bitmap covering blocks on all storage devices. In some aspects, the bitmap may be per storage device such that each storage device has an individual bitmap.

FIG. 1 depicts a block storage system 100 for managing free space for transparent block-level compression in accordance with examples of the present disclosure. To do so, the cloud-based block storage system 100 includes one or more storage devices 140, a storage management system 120, and a server 160 that is communicatively coupled to the storage management system 120 via a network 150. The network 150 may include any kind of computing network including, without limitation, a wired or wireless local area network (LAN), a wired or wireless wide area network (WAN), and/or the Internet. It should be appreciated that the storage devices 140 are configured to store data blocks, and each data block is assigned a unique block address.

The storage management system 120 is communicatively coupled to the server 160 and the storage devices 140. The storage management system 120 includes a processor 122, a memory 124, a communication interface 126, and a space allocator 130. The free space manager 130 is configured to maintain and track range lists for certain ranges of free spaces (e.g., 1 KB, 2 KB, 3 KB, 4 KB, etc.). Each range list is a queue with a fixed size and implemented using a circular buffer, which eliminates a need for a linked list pointer and further reduces memory overhead. Each range entry in the range list is an address of free space on the storage devices 140. The free space manager 130 is configured to walk through the Compression Mapping Table (CMT) to reconstruct the free space information on initialization (e.g., during boot up). The free space manager 130 is configured to construct a bitmap of free space and store in a reserved area on the storage device 140. For example, the range lists are sized to align with the expected write throughput. Rest of the free space information is tracked in the bitmap which is stored on the backend storage devices, and is used to replenish the range lists as needed and reallocate overflow of the range lists. In other words, the range lists serve like a quick cache for serving allocation needs, while the bitmap on the storage device provides the overall picture of available free space, replenishes the range lists when needed, and reallocates overflow of the range lists. To do so, the free space manager 130 further includes an allocation manager 132, a deallocation manager 134, a replenishment manager 136, and an overflow manager 138.

The allocation manager 132 is configured to allocate free space for compressed blocks from range lists. A request for allocating space is served from one of the range lists according to its demand of size. The allocation manager 132 is configured to receive an allocation request for writing a compressed block. It should be appreciated that the allocation request includes a requested size of free space (i.e., a size of the compressed block). However, in some aspects, the allocation manager 132 may be configured to determine the size of the compressed block to determine the size of free space needed. For example, if compression is done on 4 KB blocks, the compressed block size is between 1 KB and 4 KB. In such an example, the four range lists (e.g., List_1K for a list of 1 KB ranges of free space, List_2K for a list of 2 KB ranges of free space, List_3K_for a list of 2 KB ranges of free space, and List_4K for a list of 4 KB ranges of free space) may be adequate for serving the allocation needs. However, it should be appreciated that additional range lists may be further defined for larger ranges (e.g., 9 KB, 16 KB, 32 KB, etc.) to improve the efficiency of allocation, which is described further below.

The allocation manager 132 may be configured to determine if a range entry is available in a range list adequate for serving the allocation request. In the example above, if the requested size of free space is 2 KB, the allocation manager 132 is configured to examine the List_2K range list for free spaces of 2 KB and determine if there is an available range entry in the List_2K range list. If the free space entry in the range list is not available, the allocation manager 132 is further configured to determine a next available range list for allocation. In the example above, if there is no available range entry in the List_2K range list, the allocation manager 132 is configured to examine the List_3K range list for free spaces of 3 KB and determine if there is an available range entry in the List_3K range list. If there is no available range entry in the List_3K range list, the allocation manager 132 may be further configured to examine larger range lists (e.g., the List_4K range list) and/or smaller range lists for multiple available entries (e.g., the List_1K range list for two entries) to store the requested compressed block.

Once the range list is selected, the allocation manager 132 is configured to dequeue a range entry from the selected range list. In other words, the range entry is removed from the selected range list and the free space corresponding to the range entry is allocated to the compressed block. The allocation manager 132 is configured to serve the write request of the compressed block with the allocated free space. It should be appreciated that, in some aspects, the allocation manager 132 may be configured to choose to avoid the free space ranges from being across block boundaries to improve I/O performance on storage devices (e.g., 140). For example, if a 3 KB range that crosses 4 KB boundary may be regarded as two entries (i.e., 1 KB+2 KB) instead of one 3 KB entry to avoid unaligned write when writing compressed data.

The deallocation manager 134 is configured to deallocate spaces assigned to compressed blocks and reallocate back to corresponding range lists. The deallocation manager 134 is configured to determine if deallocation is needed. For example, the deallocation manager 134 may be configured to receive a deallocation request to release an original compressed block when a corresponding uncompressed address is rewritten. In other example, the deallocation manager 134 may be configured to receive a deallocation request to release space when the host issues a Trim command.

The deallocation manager 134 is configured to enqueue an entry into a corresponding range list according to a size of the deallocated space. In other words, the released free space is added back to one of the existing range lists as a free space range entry. It should be appreciated that, if the released free space is larger than sizes of the existing range lists, the deallocation manger 134 may divide the released free space into multiple free spaces and added to the corresponding range lists.

The replenishment manager 136 is configured to replenish range entries for range lists from the bitmap when a number of range entries of the range lists falls below a predetermined threshold (e.g., 25%). The replenishment manager 136 is configured to replenish the free space lists to their capacity or a predetermined threshold during the initialization. The replenishment manager 136 is also configured to replenish any larger free space ranges during the initialization. The larger free space ranges serve as a pool of free spaces for replenishing smaller range lists at runtime. During runtime, the replenishment manager 136 is configured to determine if replenishment of one or more range entries is needed for a range list. For example, the free space manager 130 may be configured to determine that the replenishment for the range list is needed if a number of range entries in the range list falls below a predetermined threshold (e.g., 25%) after dequeuing a range entry from the range list.

The replenishment manager 136 is configured to identify a free space range in the bitmap that corresponds to the free space range of the requested range list being replenished. For example, if the requested range list being replenished is for List_3K (i.e., a list of 3 KB ranges of free space), the replenishment manager 136 is configured to walk through the bitmap to find a next free space range that is 3 KB. Once the free space range in the bitmap is identified, the replenishment manager 136 is configured to enqueue a range entry (i.e., the identified free space range) into the requested range list. The replenishment manager 136 is further configured to indicate the identified free space range as "used" (i.e., no longer "free") in the bitmap. By marking the space range added to the range list as "used" in the bitmap, the replenishment manager 136 ensures that the particular space range will not be replenished again during replenishment tasks (e.g., preventing "double allocation" of the space range during replenishment).

Additionally, the replenishment manager 136 is further configured to determine if there is free space left over after allocation and enqueue the remaining left over free space into a corresponding range list. For example, if the requested size of free space is 2 KB and the range entry is selected from the List_3K range list, there is 1 KB free space left over after allocation of 2 KB of the compressed block to the 3K free space range entry. In such an example, the replenishment manager 136 is configured to enqueue the 1 KB free space into the List_1K range list for free spaces of 1 KB.

The replenishment manager 136 is configured to continue replenish the selected range list from the bitmap until the predetermined target threshold is reached or a cut-off deadline is exceeded. It should be appreciated that the replenishment manager 136 is configured to perform the replenishment tasks the background. It should also be appreciated that, in some aspects, the replenishment manager 136 may be configured to aggregate replenishment tasks for multiple range lists to reduce the number of reads from the bitmap stored in the storage device.

It should be appreciated that, in some aspects, the free space manager 130 may track larger free ranges to further improve the efficiency of allocation. For example, additional larger range lists (e.g., List_8K, List_16K, List_32K, List_64K, and so on) may be generated and maintained. The larger range lists are managed in the same way as other range lists (e.g., replenished from or overflow to the bitmap); however, they do not serve allocation requests directly. Instead, the larger range lists serve as pools for replenishing smaller free range entries. For example, if the number of entries of List_4K falls below a predetermined threshold, the free space manager 130 may replenish the List_4K range list from the entries in List_8K by splitting each 8K range into two 4K ranges instead of from the bitmap. This may further improve the efficiency of the free space manager 130. In some aspects, the larger range lists may be replenished by merging range entries from the smaller ranges according to the size of the larger range lists.

The overflow manager 138 is configured to reallocate overflow of range entries from range lists back to the bitmap. To do so, the overflow manager 138 is configured to trigger or schedule an overflow task to overflow some of range entries back to a bitmap stored in a storage device. The overflow manager 138 is configured to determine if a number of entries in a range list exceeds a predetermined threshold (e.g., 90%). In some aspects, the overflow manager 138 is configured to receive an overflow task to overflow some of range entries back to the bitmap.

The overflow manager 138 is configured to dequeue one or more range entries from the requested range list to reduce the number of range entries of the requested range list below the predetermined threshold. The dequeued free space range entries are written back to the bitmap stored in the storage device. The overflow manager 138 is further configured to indicate the corresponding free space range as "free" in the bitmap. It should be appreciated that the overflow manager 138 may aggregate multiple overflow tasks to reduce the number of writes to the storage device.

Figure 2A:
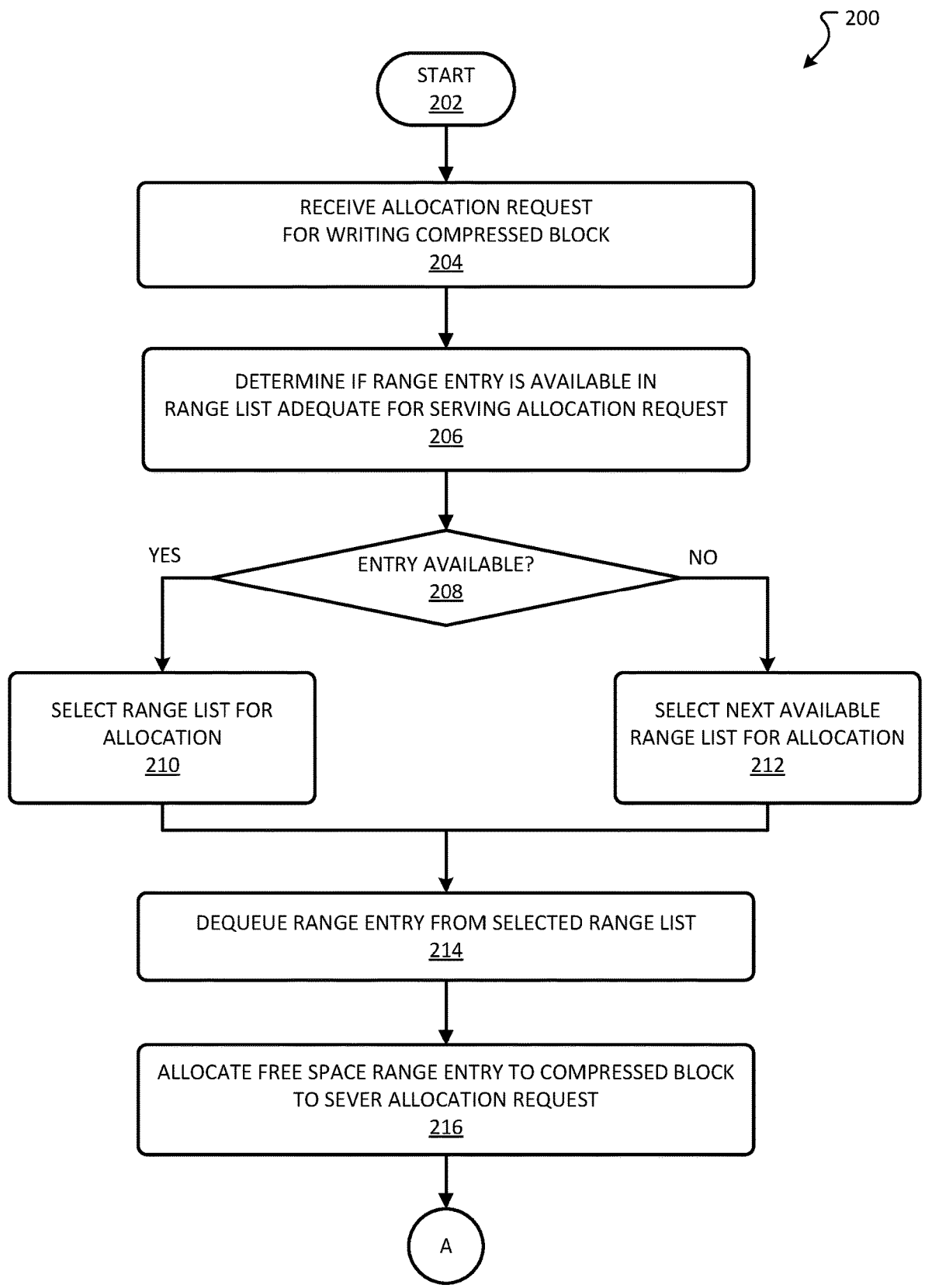
FIGS. 2A and 2B depict a flowchart of an example method of allocating free space for a compressed block from a range list in accordance with examples of the present disclosure.
Figure 2B:
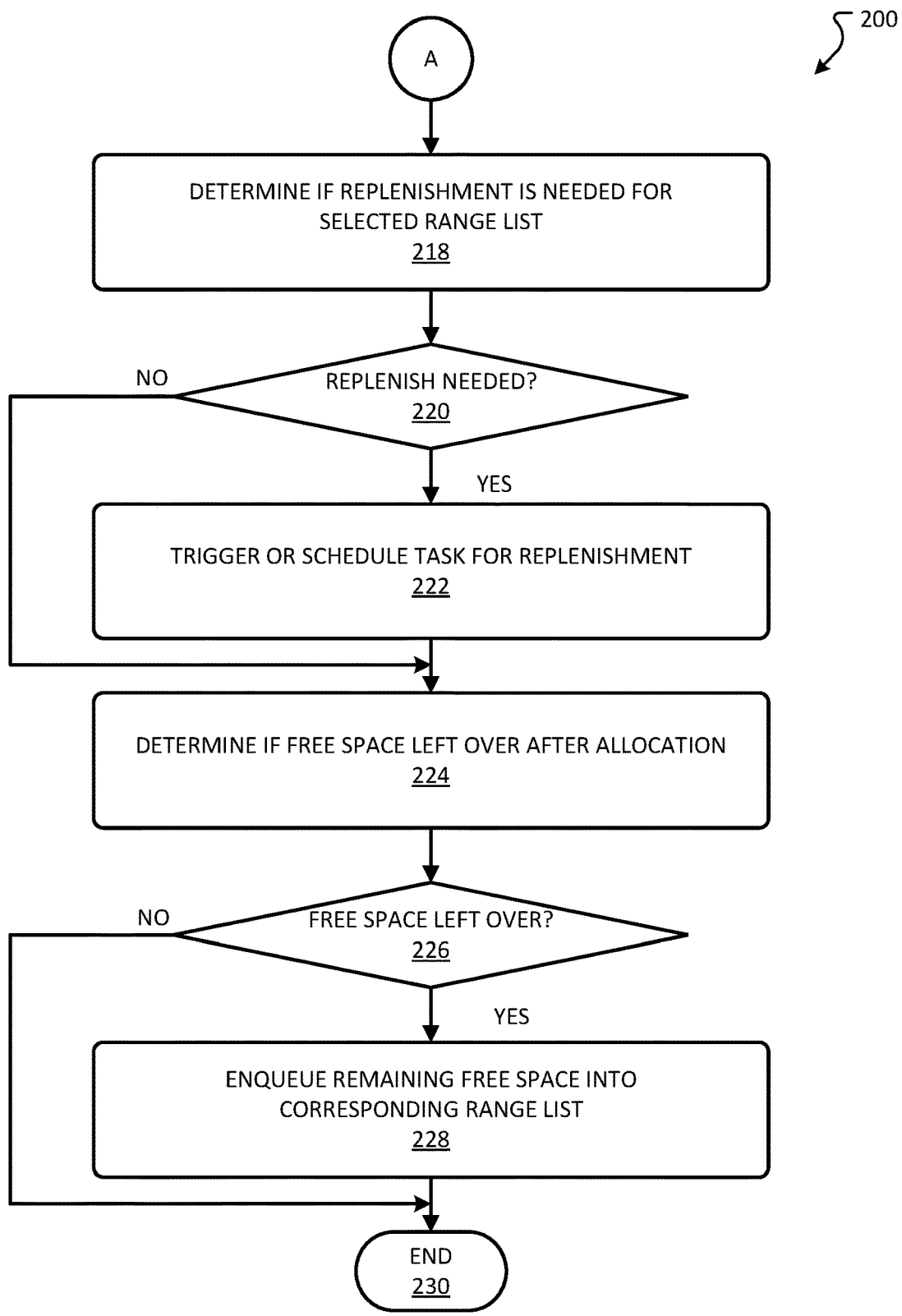

Referring now to FIGS. 2A and 2B, a method for allocating free space for a compressed block from a range list in accordance with examples of the present disclosure is described. A general order for the steps of a method 200 is shown in FIGS. 2A and 2B. Generally, the method 200 starts at 202 and ends at 230. The method 200 may include more or fewer steps or may arrange the order of the steps differently than those shown in FIGS. 2A and 2B. The method 200 can be executed as a set of computer-executable instructions executed by a computer system and encoded or stored on a computer readable medium. In the illustrative aspect, the method 200 is executed by a free space manager (e.g., 130). However, it should be appreciated that aspects of the method 200 may be performed by one or more processing devices that are capable of communicating with a host of the cloud-based block storage (e.g., the server 160) and one or more storage devices (e.g., 140). Further, the method 200 can be performed by gates or circuits associated with a processor, Application Specific Integrated Circuit (ASIC), a field programmable gate array (FPGA), a system on chip (SOC), a neural processing unit, or other hardware device. Hereinafter, the method 200 shall be explained with reference to the systems, components, modules, software, data structures, user interfaces, etc. described in conjunction with FIGS. 1, 6, and 7.

The method 200 starts at operation 202, where flow may proceed to operation 204. At operation 204, the free space manager 130 receives an allocation request for writing a compressed block. It should be appreciated that the allocation request includes a requested size of free space (i.e., a size of the compressed block). However, in some aspects, the free space manager 130 may determine the size of the compressed block to determine the size of free space needed. As described above, compression is done at block device level in units of blocks (e.g., typically 4 KB for NVMe SSDs). It should be appreciated that the compressed block is generally padded to sub-block granularity, such that the compressed block may be 1 KB, 2 KB, 3 KB, or 4 KB. In other words, if compression is done on 4 KB blocks, the compressed block size is between 1 KB and 4 KB. In such an example, the four range lists (e.g., List_1K for a list of 1 KB ranges of free space, List_2K for a list of 2 KB ranges of free space, List_3K_for a list of 2 KB ranges of free space, and List_4K for a list of 4 KB ranges of free space) may be adequate for serving the allocation needs. However, it should be appreciated that more range lists may be further defined for larger ranges (e.g., 9 KB, 16 KB, 32 KB, etc.) to improve the efficiency of allocation, which is described further below.

At operation 206, the free space manager 130 determines if a range entry is available in a range list adequate for serving the allocation request. In the example above, if the requested size of free space is 2 KB, the free space manager 130 examines the List_2K range list for free spaces of 2 KB and determines if there is an available range entry in the List_2K range list. If the free space manager 130 determines that the free space entry is available at 208, the method 200 proceeds to 210 to select the range list for allocation of the free space entry.

If, however, the free space manager 130 determines that the free space entry in the range list at operation 208, the method 200 proceeds to operation 212. At operation 212, the free space manager 130 determines a next available range list for allocation. In the example above, if there is no available range entry in the List_2K range list, the free space manager 130 examines the List_3K range list for free spaces of 3 KB and determines if there is an available range entry in the List_3K range list. If there is an available range entry in the List_3K range list, the free space manager 130 selects the List_3K range list. If there is no available range entry in the List_3K range list, the free space manger 130 may examine larger range lists (e.g., the List_4K range list) and/or smaller range lists for multiple available entries (e.g., the List_1K range list for two entries) to store the requested compressed block.

Once the range list is selected, at operation 214, the free space manager 130 dequeues a range entry from the selected range list. At operation 216, the free space manager 130 allocates the free space corresponding to the range entry to the compressed block to serve the allocation request. In other words, the range entry is removed from the selected range list and the free space corresponding to the range entry is allocated to the compressed block.

Subsequently, at operation 218 of FIG. 2B, the free space manager 130 determines if replenishment of one or more range entries is needed for the selected range list. For example, the free space manager 130 may determine that the replenishment for the selected range list is needed if a number of range entries in the selected range list falls below a predetermined threshold (e.g., 25%) after dequeuing a range entry in operation 214. If the free space manger 130 determines that the replenishment is needed in operation 220, the method 200 advances to operation 222 to trigger or schedule a task for replenishment, which is further described in FIG. 4.

If, however, the free space manger 130 determines that the replenishment is not needed in operation 220, the method 200 skips ahead to operation 224. At operation 224, the free space manager 130 determines if there is free space left over after allocation. If the free space manager 130 determines that there is free space left over in operation 226, the method 200 advances to operation 228 to enqueue the remaining free space into a corresponding range list. In the example above, if the requested size of free space is 2 KB and the range entry is selected from the List_3K range list, there is 1 KB free space left over after allocation of 2 KB of the compressed block to the 3K free space range entry. In such an example, the free space manager 130 enqueues the 1 KB free space into the List_1K range list for free spaces of 1 KB. Subsequently, the method 200 may end at operation 230.

Referring back to operation 226, if the free space manager 130 determines that there is no free space left over, the method 200 may end at operation 230.

It should be appreciated that, in some aspects, the free space manager 130 may choose to avoid the free space ranges from being across block boundaries to improve I/O performance on storage devices (e.g., 140). For example, if a 3 KB range that crosses 4 KB boundary may be regarded as two entries (i.e., 1 KB+2 KB) instead of one 3 KB entry to avoid unaligned write when writing compressed data.

Figure 3:
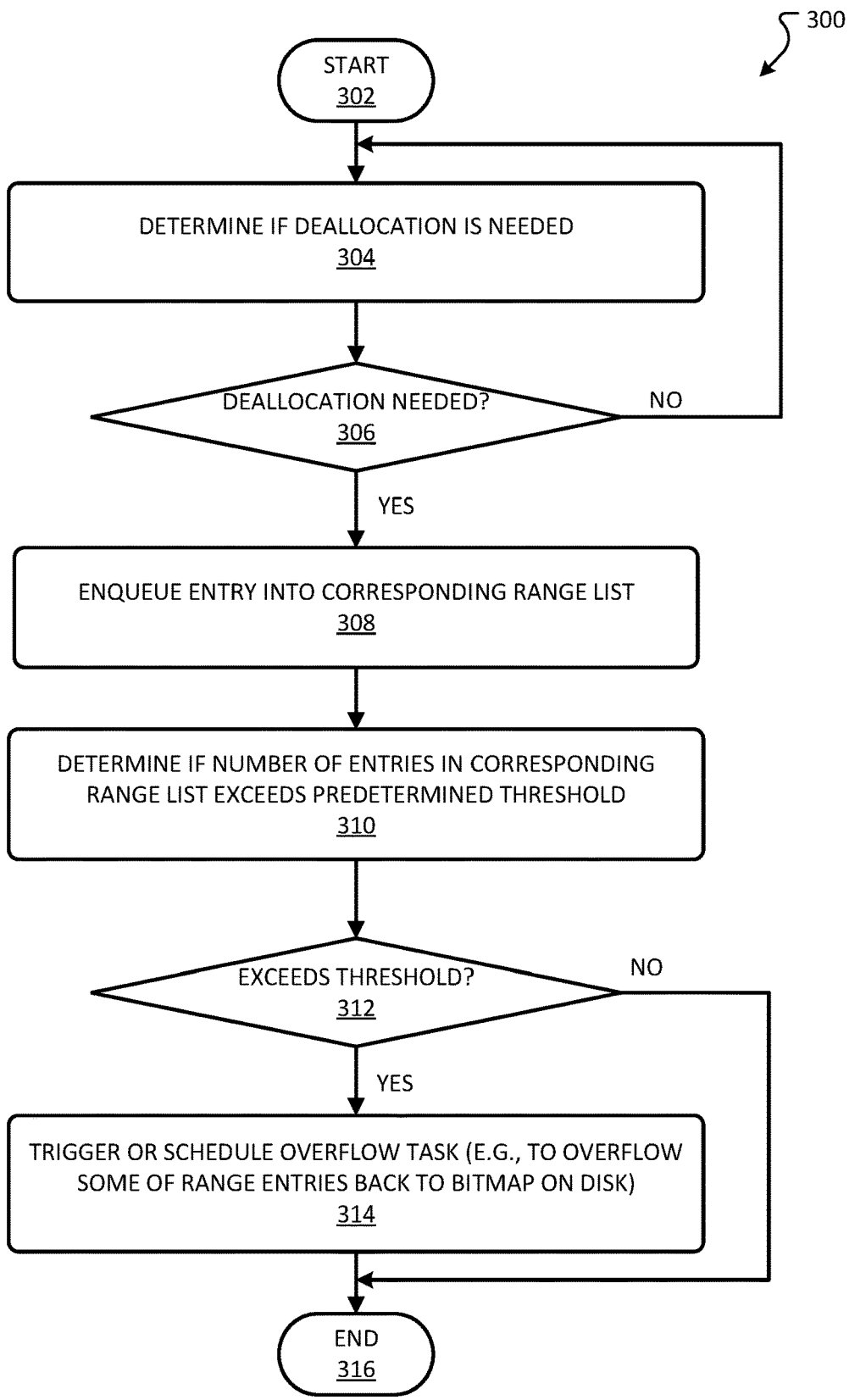
FIG. 3 depicts a flowchart of an example method of deallocating space assigned to a compressed block and reallocating back to a corresponding range list.

Referring now to FIG. 3, a method of deallocating space assigned to a compressed block and reallocating back to a corresponding range list in accordance with examples of the present disclosure is described. A general order for the steps of a method 300 is shown in FIG. 3. Generally, the method 300 starts at 302 and ends at 316. The method 300 may include more or fewer steps or may arrange the order of the steps differently than those shown in FIG. 3. The method 300 can be executed as a set of computer-executable instructions executed by a computer system and encoded or stored on a computer readable medium. In the illustrative aspect, the method 300 is executed by a free space manager (e.g., 130). However, it should be appreciated that aspects of the method 300 may be performed by one or more processing devices that are capable of communicating with a host of the cloud-based block storage (e.g., the server 160) and one or more block storage devices (e.g., 144). Further, the method 300 can be performed by gates or circuits associated with a processor, Application Specific Integrated Circuit (ASIC), a field programmable gate array (FPGA), a system on chip (SOC), a neural processing unit, or other hardware device. Hereinafter, the method 300 shall be explained with reference to the systems, components, modules, software, data structures, user interfaces, etc. described in conjunction with FIGS. 1, 6, and 7.

The method 300 starts at 302, where flow may proceed to operation 304. At operation 304, the free space manager 130 determines if deallocation is needed. For example, the free space manager 130 may receive a deallocation request to release an original compressed block when a corresponding uncompressed address is rewritten. In other example, the free space manager 130 may receive a deallocation request to release space when the host issues a Trim command. If the free space manager 130 determines if the deallocation is not needed at operation 306, the method 300 loops back to operation 304 to continue determining if the deallocation is needed. If, however, the free space manager 130 determines if the deallocation is needed at operation 306, the method 300 advances to operation 308.

At operation 308, the free space manager 130 enqueues an entry into a corresponding range list according to a size of the deallocated space. In other words, the released free space is added back to one of the existing range lists as a free space range entry. It should be appreciated that, if the released free space is larger than sizes of the existing range lists, the released free space may be divided into multiple free spaces and added to the corresponding range lists.

Subsequently, at operation 310, the free space manager 130 determines if a number of entries in the corresponding range list exceeds a predetermined threshold (e.g., 90%). If the free space manager 130 determines that the number of entries in the corresponding range list does not exceed the predetermined threshold at operation 312, the method 300 may end at operation 316.

If, however, the free space manager 130 determines that the number of entries in the corresponding range list exceeds the predetermined threshold at operation 312, the method 300 advances to operation 314. At operation 314, the free space manager 130 triggers or schedules an overflow task to overflow some of range entries back to a bitmap stored in a storage device, which is further described in FIG. 5. It should be appreciated that the free space manager 130 may aggregate multiple overflow tasks to reduce the number of writes to the storage device. Subsequently, the method 300 may end at operation 316.

Figure 4:
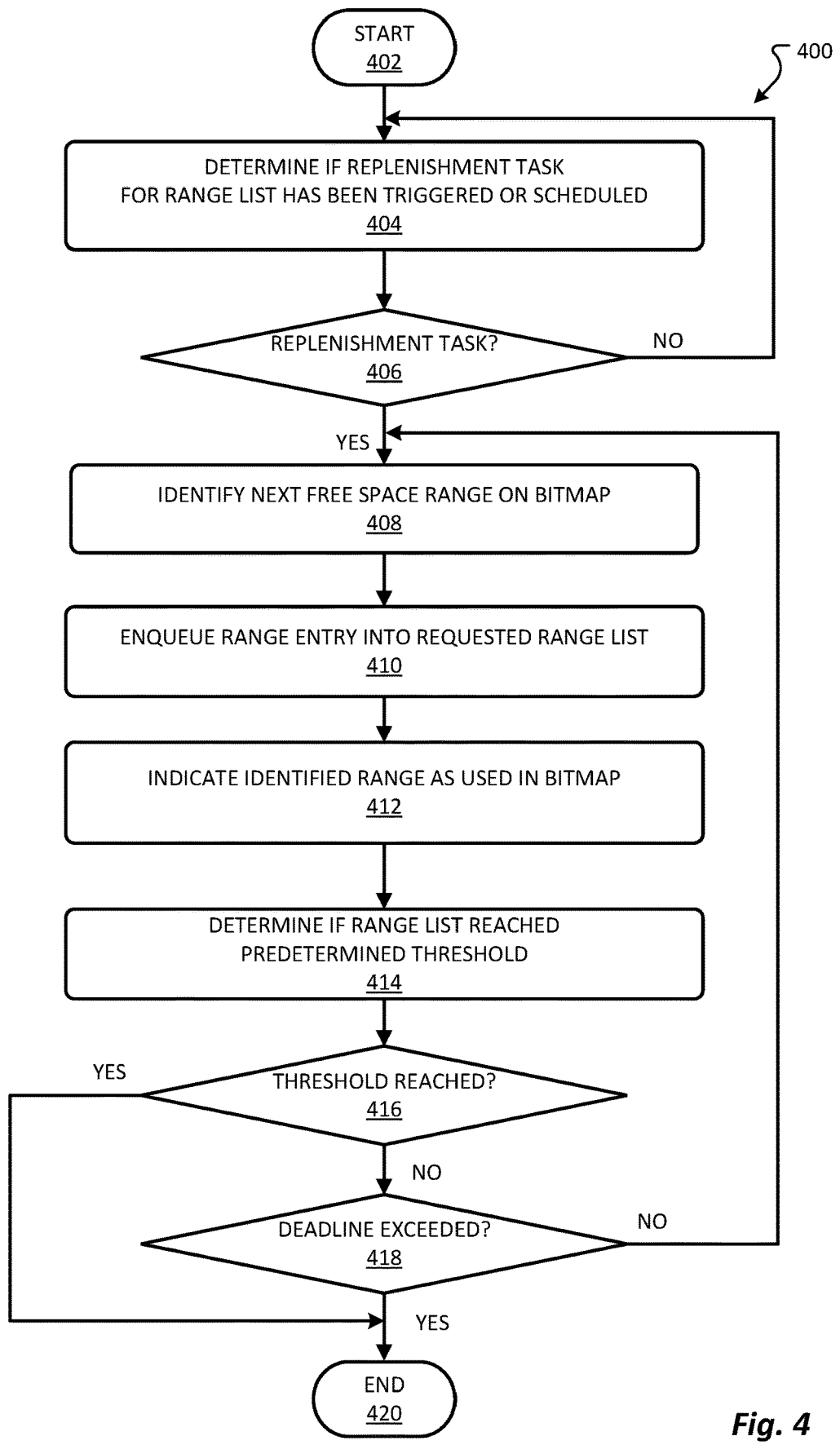
FIG. 4 depicts a flowchart of an example method of replenishing range entries for a range list from a bitmap when a number of range entries of the range list falls below a predetermined threshold in accordance with examples of the present disclosure.

Referring now to FIG. 4, a method of replenishing range entries for a range list from a bitmap when a number of range entries of the range list falls below a predetermined threshold in accordance with examples of the present disclosure is described. A general order for the steps of a method 400 is shown in FIG. 4. Generally, the method 400 starts at 402 and ends at 420. The method 400 may include more or fewer steps or may arrange the order of the steps differently than those shown in FIG. 4. The method 400 can be executed as a set of computer-executable instructions executed by a computer system and encoded or stored on a computer readable medium. In the illustrative aspect, the method 400 is executed by a free space manager (e.g., 130). However, it should be appreciated that aspects of the method 400 may be performed by one or more processing devices that are capable of communicating with a host of the cloud-based block storage (e.g., the server 160) and one or more block storage devices (e.g., 144). Further, the method 300 can be performed by gates or circuits associated with a processor, Application Specific Integrated Circuit (ASIC), a field programmable gate array (FPGA), a system on chip (SOC), a neural processing unit, or other hardware device. Hereinafter, the method 400 shall be explained with reference to the systems, components, modules, software, data structures, user interfaces, etc. described in conjunction with FIGS. 1, 6, and 7.

The method 400 starts at 402, where flow may proceed to operation 404. At operation 404, the free space manager 130 determines if a replenishment task for a range list tracking a certain free space range has been triggered or scheduled. For example, as described above in operations 218-222 of FIG. 2B, the free space manager 130 may determine that the replenishment for a range list is needed if a number of range entries in the range list falls below a predetermined threshold (e.g., 25%) after dequeuing a range entry. If the free space manger 130 determines that the replenishment is needed, the free space manager 130 may trigger or schedule a task for replenishment for the range list.

If the free space manager 130 determines that a replenishment task has not been triggered or scheduled at operation 406, the method 400 loops back to operation 404 to continue determining if a replenishment task has been triggered or scheduled. If, however, the free space manager 130 determines that a replenishment task for a range list has been triggered or scheduled at operation 406, the method 400 advances to operation 408.

At operation 408, the free space manager 130 identifies a next free space range in the bitmap that corresponds to the free space range of the requested range list being replenished. For example, if the requested range list being replenished is for List_3K (i.e., a list of 3 KB ranges of free space), the free space manager 130 walks through the bitmap to find a next free space range that is 3 KB.

Once the free space range in the bitmap is identified, at operation 410, the free space manger 130 enqueues a range entry (i.e., the identified free space range) into the requested range list. Subsequently or concurrently, at operation 412, the free space manager 130 indicates the identified free space range as "used" (i.e., no longer "free") in the bitmap. By marking the space range added to the range list as "used" in the bitmap, the free space manager 130 ensures that the particular space range will not be replenished again during replenishment tasks (e.g., preventing "double allocation" of the space range during replenishment).

At operation 414, the free space manager 130 determines if a number of range entries in the requested range list reached a predetermined target threshold. If the free space manager 130 determines that the predetermined target threshold is reached, the method 400 may end at 420. If, however, the free space manager 130 determines that the predetermined target threshold has not been reached, the method 400 advances to operation 418 to further determine if a certain cut-off deadline has been exceeded. If the cut-off deadline is reached, the method 400 may end at 420.

If, however, the free space manager 130 determines that the predetermined target threshold has not been reached and the cut-off deadlines has not been exceeded, the method 400 loops back to operation 408 to continue identifying a next free space range on the bitmap to replenish the requested range list.

It should be appreciated that the replenishment task is performed in the background and is not on a critical input/output (I/O) path. It should also be appreciated that, in some aspects, the free space manager 130 may aggregate replenishment tasks for multiple range lists to reduce the number of reads from the bitmap stored in the storage device.

It should be appreciated that, in some aspects, the free space manager 130 may track larger free ranges to further improve the efficiency of allocation. For example, additional larger range lists (e.g., List_8K, List_16K, List_32K, List_64K, and so on) may be generated and maintained. The larger range lists are managed in the same way as other range lists (e.g., replenished from or overflow to the bitmap); however, they do not serve allocation requests directly. Instead, the larger range lists serve as pools for replenishing smaller free range entries. For example, if the number of entries of List_4K falls below a predetermined threshold, the free space manager 130 may replenish the List_4K range list from the entries in List_8K by splitting each 8K range into two 4K ranges instead of from the bitmap. This may further improve the efficiency of the free space manager 130. In some aspects, the larger range lists may be replenished by merging range entries from the smaller ranges according to the size of the larger range lists.

Figure 5:
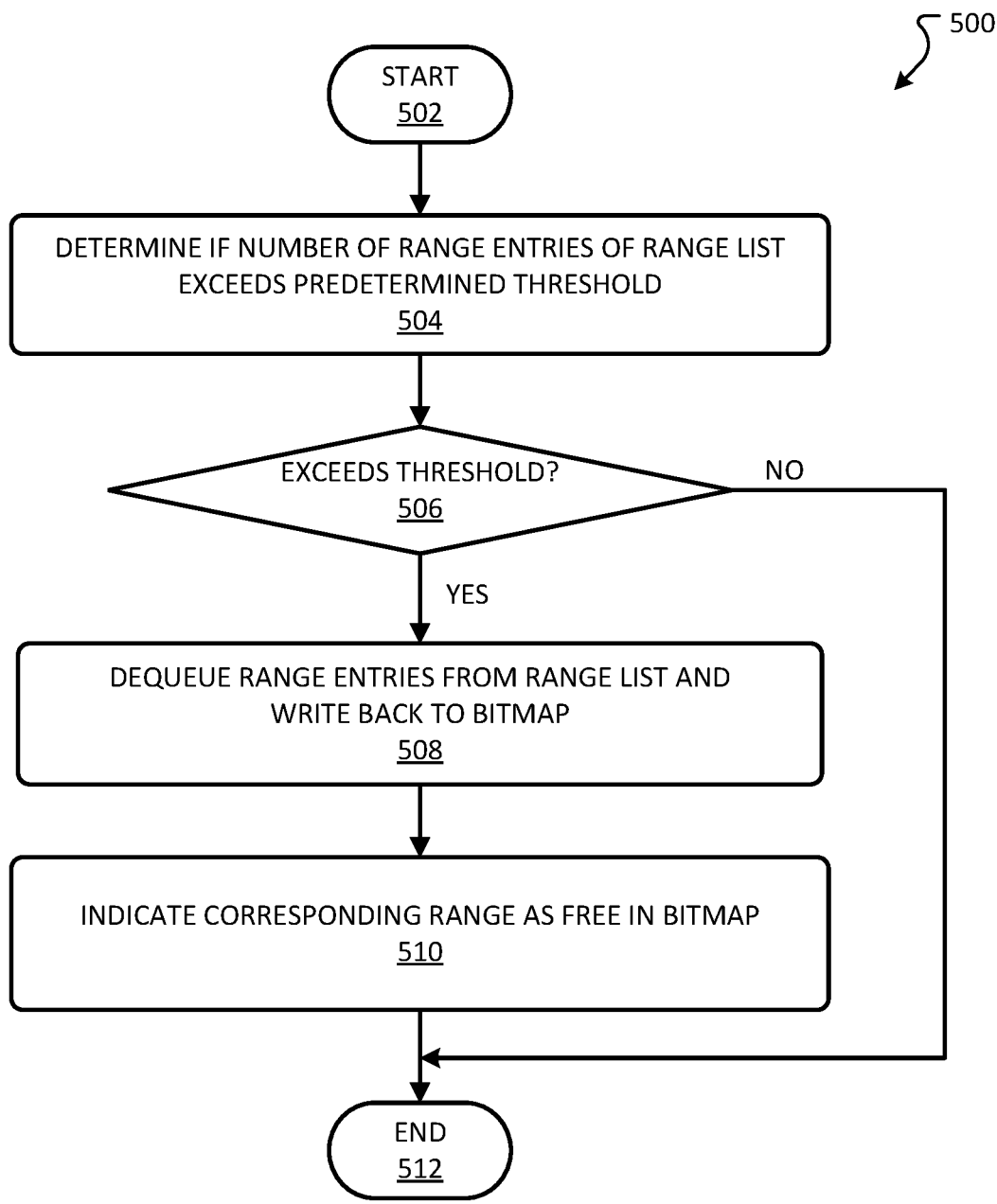
FIG. 5 depicts a flowchart of an example method of reallocating overflow of range entries from a range list back to a bitmap in accordance with examples of the present disclosure.

Referring now to FIG. 5, a method of reallocating overflow of range entries from a range list back to a bitmap in accordance with examples of the present disclosure is described. A general order for the steps of a method 500 is shown in FIG. 5. Generally, the method 500 starts at 502 and ends at 512. The method 500 may include more or fewer steps or may arrange the order of the steps differently than those shown in FIG. 5. The method 500 can be executed as a set of computer-executable instructions executed by a computer system and encoded or stored on a computer readable medium. In the illustrative aspect, the method 500 is executed by a free space manager (e.g., 130). However, it should be appreciated that aspects of the method 500 may be performed by one or more processing devices that are capable of communicating with a host of the cloud-based block storage (e.g., the server 160) and one or more block storage devices (e.g., 144). Further, the method 500 can be performed by gates or circuits associated with a processor, Application Specific Integrated Circuit (ASIC), a field programmable gate array (FPGA), a system on chip (SOC), a neural processing unit, or other hardware device. Hereinafter, the method 400 shall be explained with reference to the systems, components, modules, software, data structures, user interfaces, etc. described in conjunction with FIGS. 1, 6, and 7.

The method 500 starts at 502, where flow may proceed to 504. At 504, the free space manager 130 determines if a number of range entries of a range list exceeds a predetermined threshold (e.g., 90%). In some aspects, the free space manager 130 may receive an overflow task to overflow some of range entries back to a bitmap.

If the free space manager 130 determines that the number of range entries of the requested range list does not exceed the predetermined threshold, the method 500 may end at operation 512. If, however, the free space manager 130 determines that the number of range entries of the requested range list exceeds the predetermined threshold, the method 500 advances to operation 508.

At operation 508, the free space manager 130 dequeues one or more range entries from the requested range list to reduce the number of range entries of the requested range list below the predetermined threshold. The dequeued free space range entries are written back to the bitmap stored in the storage device.

Subsequently or concurrently, at operation 510, the free space manager 130 indicates the corresponding free space range as "free" in the bitmap. Subsequently, the method 500 may end at operation 512. It should be appreciated that, in some aspects, the free space manager 130 may aggregate multiple overflow tasks to reduce the number of writes to the storage device.

Figure 6:
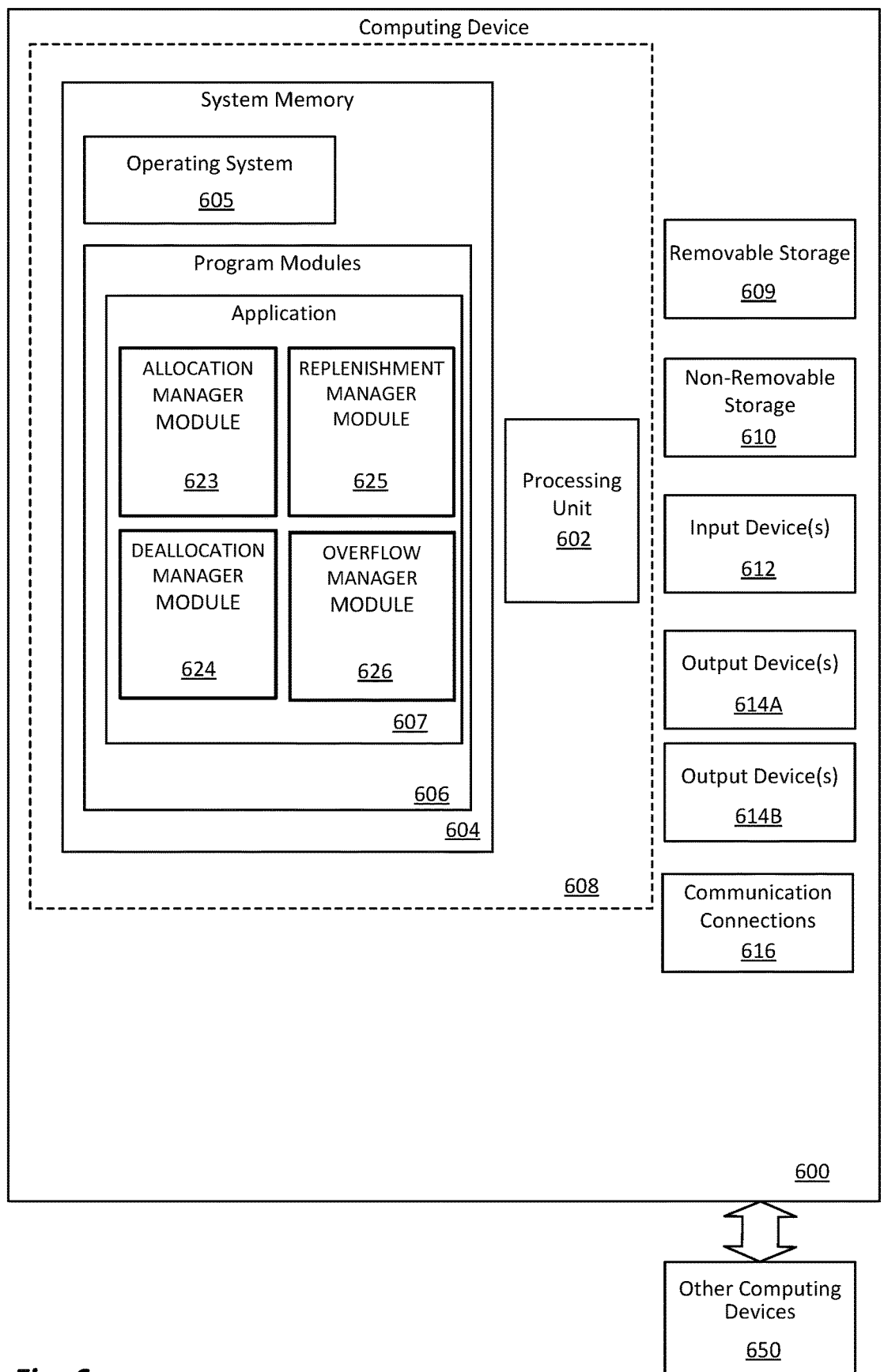
FIG. 6 depicts a block diagram illustrating physical components (e.g., hardware) of a computing device with which aspects of the disclosure may be practiced.

FIG. 6 is a block diagram illustrating physical components (e.g., hardware) of a computing device 600 with which aspects of the disclosure may be practiced. The computing device components described below may be suitable for the computing devices described above. For example, the computing device 600 may represent the storage management system 120 of FIG. 1. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories.

The system memory 604 may include an operating system 605 and one or more program modules 606 suitable for performing the various aspects disclosed herein such. The operating system 605, for example, may be suitable for controlling the operation of the computing device 600. Furthermore, aspects of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, several program modules and data files may be stored in the system memory 604. While executing on the at least one processing unit 602, the program modules 606 may perform processes including, but not limited to, one or more aspects, as described herein. The application 620 includes an allocation manager module 623, a deallocation manager module 624, a replenishment manager module 625, and an overflow manager module 626, as described in more detail with regard to FIG. 1. Other program modules that may be used in accordance with aspects of the present disclosure may include electronic mail and contacts applications, word processing applications, spreadsheet applications, database applications, slide presentation applications, drawing or computer-aided application programs, etc., and/or one or more components supported by the systems described herein.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general-purpose computer or in any other circuits or systems.

The computing device 600 may also have one or more input device(s) 612 such as a keyboard, a mouse, a pen, a sound or voice input device, a touch or swipe input device, etc. The output device(s) 614A such as a display, speakers, a printer, etc. may also be included. An output 614B, corresponding to a virtual display may also be included. The aforementioned devices are examples and others may be used. The computing device 600 may include one or more communication connections 616 allowing communications with other computing devices 640. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7:
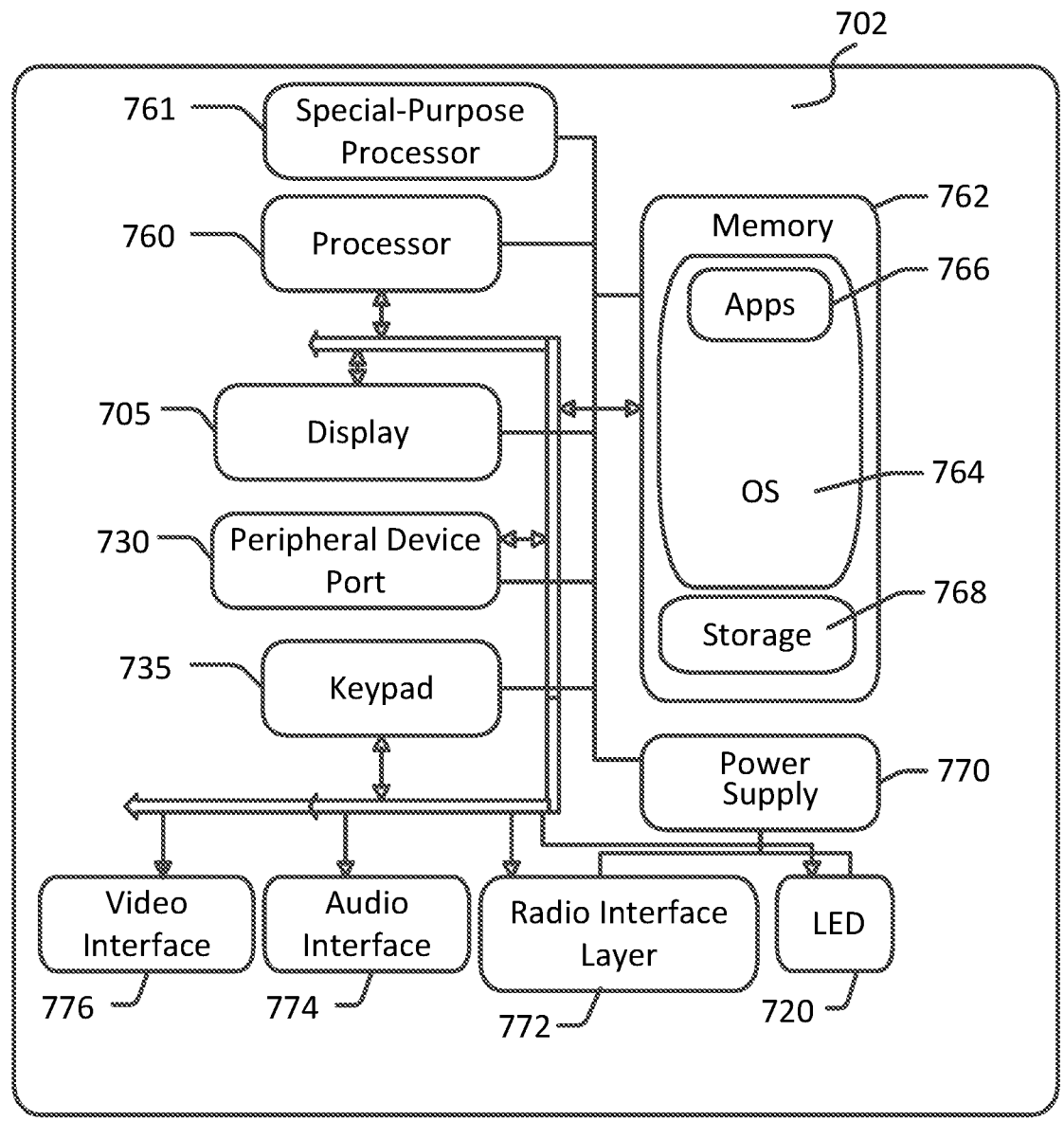
FIG. 7 illustrates an example of a computing device with which aspects of the disclosure may be practiced.

FIG. 7 is a block diagram illustrating the architecture of one aspect of computing device or a server. That is, the computing device can incorporate a system (502) (e.g., an architecture) to implement some aspects. The system 702 can implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and/or one or more components supported by the systems described herein. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the computing device described herein (e.g., an allocation manager module 623, a deallocation manager module 624, a replenishment manager module 625, and an overflow manager module 626, etc.).

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 may be used to provide visual notifications, and/or an audio interface 774 may be used for producing audible notifications via the audio transducer 725. In the illustrated configuration, the visual indicator 720 is a light emitting diode (LED) and the audio transducer 725 is a speaker. These devices may be directly coupled to the power supply 770 so that when activated, they remain on for a duration dictated by the notification mechanism even though the processor 760/761 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with aspects of the present disclosure, the microphone may also serve as an audio sensor to facilitate control of notifications, as will be described below. The system 702 may further include a video interface 776 that enables an operation of an on-board camera to record still images, video stream, and the like.

A computing device implementing the system 702 may have additional features or functionality. For example, the computing device may also include additional data storage devices (removable and/or non-removable) such as, magnetic disks, optical disks, or tape. Such additional storage is illustrated in FIG. 6 by the non-volatile storage area 768.

Data/information generated or captured by the computing device and stored via the system 702 may be stored locally on the computing device, as described above, or the data may be stored on any number of storage media that may be accessed by the device via the radio interface layer 772 or via a wired connection between the computing device and a separate computing device associated with the computing device, for example, a server computer in a distributed computing network, such as the Internet. As should be appreciated such data/information may be accessed via the computing device via the radio interface layer 772 or via a distributed computing network. Similarly, such data/information may be readily transferred between computing devices for storage and use according to well-known data/information transfer and storage means, including electronic mail and collaborative data/information sharing systems.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The exemplary systems and methods of this disclosure have been described in relation to computing devices. However, to avoid unnecessarily obscuring the present disclosure, the preceding description omits several known structures and devices. This omission is not to be construed as a limitation. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

Several variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

The disclosure is not limited to standards and protocols if described. Other similar standards and protocols not mentioned herein are in existence and are included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

(A1) In one aspect, some examples include a method for space allocation for block device compression. The method includes receiving an allocation request to write the compressed data, the allocation request including a size of the compressed data, selecting a range list adequate for serving the allocation request from a plurality of range lists, each range list configured to track free spaces of a certain size and has a plurality of range entries, dequeuing a range entry from the selected range list to allocate free space for the compressed data, and allocating the free space corresponding to the range entry to the compressed data to serve the allocation request.

(A2) In some examples of A1, wherein the plurality of range lists is sized to align with expected write throughput and is communicatively coupled to a bitmap, which is configured to track the rest of free space that is not in the plurality of range lists.

(A3) In some examples of A1-A2, wherein selecting the range list adequate for serving the allocation request includes determining if a range entry is available in the range list according to the size of the compressed data, in response to determining that a range entry is available in the range list according to the size of the compressed data, selecting the range list for allocating free space for the compressed data, in response to determining that a range entry is not available in the range list according to the size of the compressed data, selecting a next range list for a larger space range and determining if the next range list includes an available range entry, and in response to determining that the next range list includes an available range entry, selecting the next range list for allocating free space for the compressed data and allocating a remaining free space of the available range entry to a respective free list from the plurality of range lists.

(A4) In some examples of A1-A3, the method further includes determining if a number of range entries of the selected range list falls below a predetermined threshold, in response to determining that the number of range entries of the selected range list falls below the predetermined threshold, indicating that replenishment is needed for the selected range list, identifying a free space range on a bitmap, enqueuing a range entry into the selected range list, and indicating the identified free space range as used in the bitmap.

(A5) In some examples of A1-A4, the method further includes constructing the bitmap of free space from a Compression Mapping Table (CMT) during an initialization sequence, and storing the bitmap on the storage device.

(A6) In some examples of A1-A5, the method further includes determining if an unused portion of the allocated free space exists after writing the compressed data to the allocated free space, and in response to determining that the unused portion of the allocated free space exists, enqueuing the unused portion into a corresponding range list according to a size of the unused portion.

(A7) In some examples of A1-A6, the method further includes receiving a deallocation request for deallocating space assigned to the compressed data, and enqueuing a new range entry into a range list according to a size of the deallocated space.

In yet another aspect, some examples include a computing system including one or more processors and memory coupled to the one or more processors, the memory storing one or more instructions which when executed by the one or more processors, causes the one or more processors perform any of the methods described herein (e.g., A1-A7 described above).

In yet another aspect, some examples include a non-transitory computer-readable storage medium storing one or more programs for execution by one or more processors of a storage device, the one or more programs including instructions for performing any of the methods described herein (e.g., A1-A7 described above).

(B1) In yet another aspect, some examples include a computing device for space allocation for block device compression. The computing device may include a processor and a memory having a plurality of instructions stored thereon that, when executed by the processor, causes the computing device to: receive an allocation request to write the compressed data, the allocation request including a size of the compressed data, select a range list adequate for serving the allocation request from a plurality of range lists, each range list configured to track free spaces of a certain size and has a plurality of range entries, dequeue a range entry from the selected range list to allocate free space for the compressed data, and allocate the free space corresponding to the range entry to the compressed data to serve the allocation request.

(B2) In some examples of B1, wherein the plurality of range lists is sized to align with expected write throughput and is communicatively coupled to a bitmap, which is configured to track the rest of free space that is not in the plurality of range lists.

(B3) In some examples of B1-B2, wherein to select the range list adequate for serving the allocation request includes to determine if a range entry is available in the range list according to the size of the compressed data.

(B4) In some examples of B1-B3, wherein to select the range list adequate for serving the allocation request includes to: determine if a range entry is available in the range list according to the size of the compressed data, in response to the determination that a range entry is available in the range list according to the size of the compressed data, select the range list for allocating free space for the compressed data, in response to the determination that a range entry is not available in the range list according to the size of the compressed data, select a next range list for a larger space range and determine if the next range list includes an available range entry, and in response to the determination that the next range list includes an available range entry, select the next range list for allocating free space for the compressed data and allocate a remaining free space of the available range entry to a respective free list from the plurality of range lists.

(B5) In some examples of B1-B4, wherein the computing device is further configured to construct the bitmap of free space from a Compression Mapping Table (CMT) during an initialization sequence, and store the bitmap on the storage device.

(B6) In some examples of B1-B5, wherein the computing device is further configured to determine if an unused portion of the allocated free space exists after writing the compressed data to the allocated free space, and in response to the determination that the unused portion of the allocated free space exists, enqueue the unused portion into a corresponding range list according to a size of the unused portion (B7) In some examples of B1-B6, wherein the computing device is further configured to receive a deallocation request for deallocating space assigned to the compressed data, and enqueue a new range entry into a range list according to a size of the deallocated space (C1) In one aspect, some examples include a non-transitory computer-readable medium storing instructions for space allocation for block device compression, the instructions when executed by one or more processors of a computing device, cause the computing device to: receive an allocation request to write the compressed data, the allocation request including a size of the compressed data, select a range list adequate for serving the allocation request from a plurality of range lists, each range list configured to track free spaces of a certain size and has a plurality of range entries, dequeue a range entry from the selected range list to allocate free space for the compressed data, and allocate the free space corresponding to the range entry to the compressed data to serve the allocation request.

(C2) In some examples of C1, wherein to select the range list adequate for serving the allocation request includes to: determine if a range entry is available in the range list according to the size of the compressed data, in response to the determination that a range entry is available in the range list according to the size of the compressed data, select the range list for allocating free space for the compressed data, in response to the determination that a range entry is not available in the range list according to the size of the compressed data, select a next range list for a larger space range and determine if the next range list includes an available range entry, and in response to the determination that the next range list includes an available range entry, select the next range list for allocating free space for the compressed data and allocate a remaining free space of the available range entry to a respective free list from the plurality of range lists.

(C3) In some examples of C1-C2, wherein the instructions when executed by the one or more processors further cause the computing device to: determine if a number of range entries of the selected range list falls below a predetermined threshold, in response to the determination that the number of range entries of the selected range list falls below the predetermined threshold, indicate that replenishment is needed for the selected range list, identify a free space range on a bitmap, enqueue a range entry into the selected range list, and indicate the identified free space range as used in the bitmap.

(C4) In some examples of C1-C3, wherein the instructions when executed by the one or more processors further cause the computing device to: construct the bitmap of free space from a Compression Mapping Table (CMT) during an initialization sequence, and store the bitmap on the storage device.

(C5) In some examples of C1-C4, wherein the instructions when executed by the one or more processors further cause the computing device to: determine if an unused portion of the allocated free space exists after writing the compressed data to the allocated free space, and in response to the determination that the unused portion of the allocated free space exists, enqueue the unused portion into a corresponding range list according to a size of the unused portion.

(C6) In some examples of C1-C5, wherein the instructions when executed by the one or more processors further cause the computing device to: receive a deallocation request for deallocating space assigned to the compressed data, and enqueue a new range entry into a range list according to a size of the deallocated space.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for space allocation for block device compression, the method comprising:
   receiving an allocation request to write compressed data, the allocation request including a size of the compressed data;
   determining a first range list from a plurality of range lists based on the size of the compressed data, wherein the first range list is configured to track free spaces of a first size and has a first plurality of range entries;
   determining if a range entry from the first plurality of range entries is available in the first range list for serving the allocation request;
   in response to determining that the range entry is available in the first range list, selecting the first range list for allocating free space for the compressed data,
   in response to determining that a range entry is not available in the first range list, determining if a next range list from the plurality of range lists includes an available range entry, wherein the next range list is configured to track free spaces of a second size and has a second plurality of range entries, wherein the second size is greater than the first size;
   in response to determining that the next range list includes an available range entry, selecting the next range list for allocating free space for the compressed data;
   dequeuing a range entry from the selected range list to allocate free space for the compressed data; and
   allocating the free space corresponding to the range entry to the compressed data to serve the allocation request.

2. The method of claim 1, wherein the plurality of range lists is sized to align with expected write throughput and is communicatively coupled to a bitmap, which is configured to track the rest of free space that is not in the plurality of range lists.

3. The method of claim 1, wherein selecting the next range list for allocating free space for the compressed data includes:
   selecting the next range list for allocating free space for the compressed data and allocating a remaining free space of the available range entry to a respective free list from the plurality of range lists.

4. The method of claim 1, further comprising:
   determining if a number of range entries of the selected range list falls below a predetermined threshold;
   in response to determining that the number of range entries of the selected range list falls below the predetermined threshold, indicating that replenishment is needed for the selected range list;
   identifying a free space range on a bitmap;
   enqueuing a range entry into the selected range list; and
   indicating the identified free space range as used in the bitmap.

5. The method of claim 4, further comprising:
   constructing the bitmap of free space from a Compression Mapping Table (CMT) during an initialization sequence; and
   storing the bitmap on the storage device.

6. The method of claim 1, further comprising:
   determining if an unused portion of the allocated free space exists after writing the compressed data to the allocated free space; and
   in response to determining that the unused portion of the allocated free space exists, enqueuing the unused portion into a corresponding range list according to a size of the unused portion.

7. The method of claim 1, further comprising:
   receiving a deallocation request for deallocating space assigned to the compressed data; and
   enqueuing a new range entry into a range list according to a size of the deallocated space.

8. A computing device for space allocation for block device compression, the computing device comprising:
   a processor; and
   a memory having a plurality of instructions stored thereon that, when executed by the processor, causes the computing device to:
   receive an allocation request to write compressed data, the allocation request including a size of the compressed data;
   determine a first range list from a plurality of range lists, wherein the first range list is configured to track free spaces of a first size and has a first plurality of range entries;
   determine if a range entry from the first plurality of range entries is available in the first range list for serving the allocation request;
   in response to determination that a range entry is available in the first range list, select the first range list for allocating free space for the compressed data,
   in response to determination that a range entry is not available in the first range list, determine if a next range list from the plurality of range lists includes an available range entry, wherein the next range list is configured to track free spaces of a second size and has a second plurality of range entries, wherein the second size is greater than the first size;
   in response to determination that the next range list includes an available range entry, select the next range list for allocating free space for the compressed data;
   dequeue a range entry from the selected range list to allocate free space for the compressed data; and
   allocate the free space corresponding to the range entry to the compressed data to serve the allocation request.

9. The computing device of claim 8, wherein the plurality of range lists is sized to align with expected write throughput and is communicatively coupled to a bitmap, which is configured to track the rest of free space that is not in the plurality of range lists.

10. The computing device of claim 8, wherein to select the next range list for allocating free space for the compressed data includes to:
    select the next range list for allocating free space for the compressed data and allocate a remaining free space of the available range entry to a respective free list from the plurality of range lists.

11. The computing device of claim 8, wherein the plurality of instructions, when executed, further cause the computing device to:
    determine if a number of range entries of the selected range list falls below a predetermined threshold;
    in response to the determination that the number of range entries of the selected range list falls below the predetermined threshold, indicate that replenishment is needed for the selected range list;
    identify a free space range on a bitmap;
    enqueue a range entry into the selected range list; and
    indicate the identified free space range as used in the bitmap.

12. The computing device of claim 11, wherein the plurality of instructions, when executed, further cause the computing device to:
- construct the bitmap of free space from a Compression Mapping Table (CMT) during an initialization sequence; and
- store the bitmap on the storage device.

13. The computing device of claim 8, wherein the plurality of instructions, when executed, further cause the computing device to:
- determine if an unused portion of the allocated free space exists after writing the compressed data to the allocated free space; and
- in response to the determination that the unused portion of the allocated free space exists, enqueue the unused portion into a corresponding range list according to a size of the unused portion.

14. The computing device of claim 8, wherein the plurality of instructions, when executed, further cause the computing device to:
- receive a deallocation request for deallocating space assigned to the compressed data; and
- enqueue a new range entry into a range list according to a size of the deallocated space.

15. A non-transitory computer-readable medium storing instructions for space allocation for block device compression, the instructions when executed by one or more processors of a computing device, cause the computing device to:
- receive an allocation request to write compressed data, the allocation request including a size of the compressed data;
- determine a first range list from a plurality of range lists, wherein the first range list is configured to track free spaces of a first size and has a first plurality of range entries;
- determine if a range entry from the first plurality of range entries is available in the first range list for serving the allocation request;
- in response to determination that a range entry is available in the first range list, select the first range list for allocating free space for the compressed data,
- in response to determination that a range entry is not available in the first range list, determine if a next range list from the plurality of range lists includes an available range entry, wherein the next range list is configured to track free spaces of a second size and has a second plurality of range entries, wherein the second size is greater than the first size;
- in response to determination that the next range list includes an available range entry, select the next range list for allocating free space for the compressed data;
- dequeue a range entry from the selected range list to allocate free space for the compressed data; and
- allocate the free space corresponding to the range entry to the compressed data to serve the allocation request.

16. The non-transitory computer-readable medium of claim 15, wherein to select the next range list for allocating free space for the compressed data includes to:
- select the next range list for allocating free space for the compressed data and allocate a remaining free space of the available range entry to a respective free list from the plurality of range lists.

17. The non-transitory computer-readable medium of claim 15, wherein the instructions when executed by the one or more processors further cause the computing device to:
- determine if a number of range entries of the selected range list falls below a predetermined threshold;
- in response to the determination that the number of range entries of the selected range list falls below the predetermined threshold, indicate that replenishment is needed for the selected range list;
- identify a free space range on a bitmap;
- enqueue a range entry into the selected range list; and
- indicate the identified free space range as used in the bitmap.

18. The non-transitory computer-readable medium of claim 17, wherein the instructions when executed by the one or more processors further cause the computing device to:
- construct the bitmap of free space from a Compression Mapping Table (CMT) during an initialization sequence; and
- store the bitmap on the storage device.

19. The non-transitory computer-readable medium of claim 15, wherein the instructions when executed by the one or more processors further cause the computing device to:
- determine if an unused portion of the allocated free space exists after writing the compressed data to the allocated free space; and
- in response to the determination that the unused portion of the allocated free space exists, enqueue the unused portion into a corresponding range list according to a size of the unused portion.

20. The non-transitory computer-readable medium of claim 15, wherein the instructions when executed by the one or more processors further cause the computing device to:
- receive a deallocation request for deallocating space assigned to the compressed data; and
- enqueue a new range entry into a range list according to a size of the deallocated space.

* * * * *